No. 663,655. Patented Dec. 11, 1900.
M. E. FOREMAN.
ANIMAL TRAP.
(Application filed Sept. 10, 1900.)

(No Model.)

Witnesses
Martha E. Foreman, Inventor.
by Henry T. Bright
Attorney

UNITED STATES PATENT OFFICE.

MARTHA E. FOREMAN, OF PORTSMOUTH, VIRGINIA.

ANIMAL-TRAP.

SPECIFICATION forming part of Letters Patent No. 663,655, dated December 11, 1900.

Application filed September 10, 1900. Serial No. 29,495. (No model.)

*To all whom it may concern:*

Be it known that I, MARTHA ELIZABETH FOREMAN, a citizen of the United States, residing at Portsmouth, in the county of Norfolk and State of Virginia, have invented certain new and useful Improvements in Animal-Traps; and I do hereby declare the following to be a full, clear, and exact description of the invention, such as will enable others skilled in the art to which it appertains to make and use the same.

This invention relates to fishing and trapping, and particularly to that class known as "traps, impalement."

One object of the invention is to provide a novel trap of this class made in sections by which a number of drops are provided, that a plurality of animals may be captured by a single trap.

A further object of the invention is to provide a novel means for permitting the springing of the sections independently, so that the sections not sprung may remain set.

Furthermore, the object of the invention is to provide means for preventing binding of the sections in their descent; also, to provide a positive operation when any of the sections are released.

Finally the object of the invention is to provide an animal-trap which will possess advantages in points of simplicity, efficiency, durability, and inexpensive structure.

With the above and other objects in view the invention consists in the details of several elements and in the arrangement and combinations of parts to be hereinafter more fully set forth and claimed.

In describing the invention in detail reference will be had to the accompanying drawings, forming part of this specification, wherein like characters denote corresponding parts in the several views, and in which—

Figure 1:
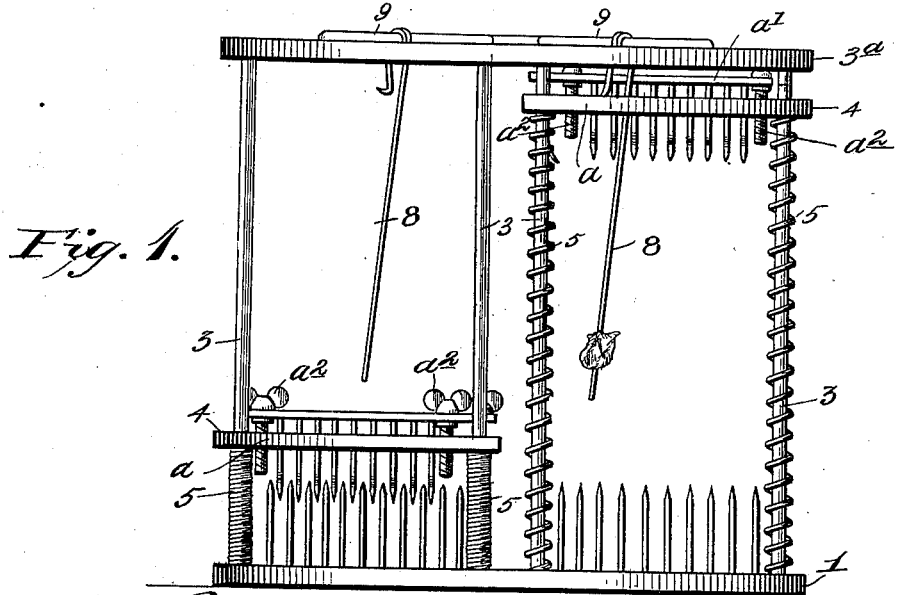
Figure 2:
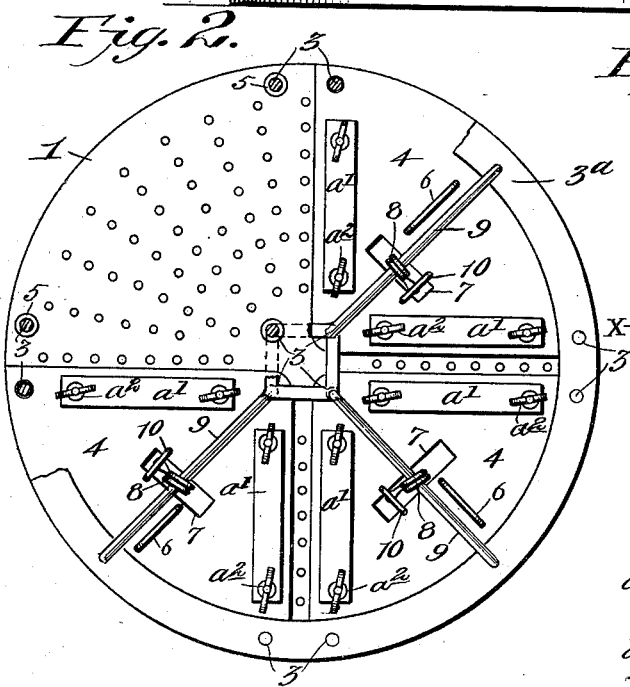
Figure 3:
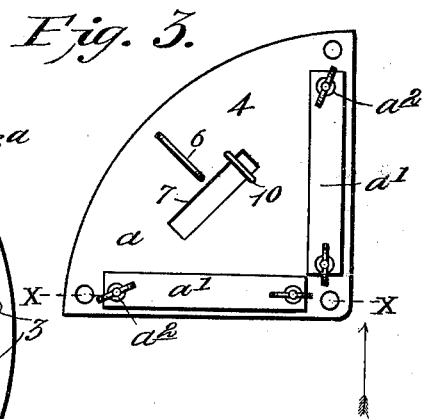
Figure 4:
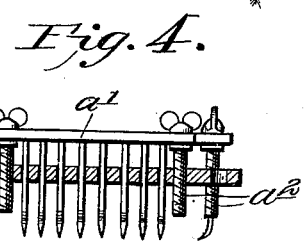

Figure 1 is a side view in elevation, showing an animal-trap embodying the invention. Fig. 2 is a plan view with one segmental portion removed. Figs. 3 and 4 are detail views.

In the drawings, 1 denotes the base of the trap provided with a series of impaling-pins extending upwardly from the surface. Arranged around the center of the base I provide a series of uprights or guides 3, the number depending upon the segments into which the trap is divided, it being necessary that one guide be provided at the center for each segment of the trap. Stationed near the outer edge of the base is a series of guides 3, two for each of the segments of the trap. A ring $3^a$ connects all of the guides 3 at the top and with the guides forms a frame structure. The segments 4 are provided with downwardly-extending impaling-pins, and each corner of the segment is provided with a hole to receive the guides just described. Springs 5 encircle the guides and are anchored at one end in the base. The upper ends of the springs are attached to the corners of the segments, and when said segments are elevated, as they must be when the trap is set, the springs exert a pull, so that when a segment is released it descends with great speed and contacts with an object standing below, and it will be understood that the springs will continue to exert the pull until the segment is elevated by an attendant. For the purpose of elevating the segments I provide each with a handle 6, as clearly shown in the drawings. Each segment is provided with an aperture 7, through which the bait-hook 8 depends, said hook being coiled around the supporting-wire 9 and terminating in a trigger. The supporting-wire may be secured in any desired manner—as, for instance, by having the inner ends of said wires attached on the inner guides and the outer ends to the ring at a point between the outer guides. A hook 10 is secured to the upper surface of each segment and is engaged by the trigger to hold the segment elevated and the trap set.

It will be understood from the foregoing description and from the illustration that the number of segments may be varied to suit particular requirements; but in practice it has been found that three or four falls for each base have proven most satisfactory.

Each segment is provided with means for adjusting the impaling-pins with relation to the lower surface, so that said pins may be set to protrude a greater or less distance. To accomplish this result, the lower plate $a$ of the segment is apertured, and the impaling-pins, which have their ends embedded in the upper traveling plate $a'$, protrude through the apertures. The lower plate $a$ has screw-threaded holes to receive the set-screws $a^2$, which are rotatable in the upper traveling plate $a'$, so that as the said screws are turned the plate $a'$ is elevated or lowered, according to the direction of rotation of the screws, and as said plate carries the impaling-pins they can be made to protrude to a greater or less degree.

The construction, operation, and advantages will, it is thought, be understood from the foregoing description, and it will be noted that the tension of the spring may be varied and that the proportions and other details of construction may be resorted to without departing from the scope of the claims.

Having fully described the invention, what I desire to secure by Letters Patent is—

1. In an animal-trap, a base, guides extending upwardly therefrom, impaling-pins projecting from the upper surface of the base, traveling sections acting in conjunction with the base, said traveling sections comprising an upper and lower plate suitably connected, impaling-pins embedded in the upper plate and projecting through holes in the lower plate, means for adjusting the upper plate, and means for drawing the traveling section toward the base.

2. In an animal-trap, a suitable base having impaling-pins, guides projecting from the base, springs anchored in the base and encircling the guides, segments having apertures to receive the guides, and to which the upper ends of the springs are connected, bait-hooks suitably suspended, with their ends depending through apertures of the segments, and hooks secured to the upper surfaces of the segments and supported by triggers on the bait-hooks.

3. In an animal-trap, a base having impaling-pins, guides projecting from the base, a ring connecting the guides at the top, segments traveling on the guides and having impaling-pins, springs anchored in the base and secured to the segments, and handles on the segments, substantially as described.

4. In an animal-trap, a base having impaling-pins, and a traveling member, acting in conjunction with the said base having adjustable impaling-pins, substantially as described.

5. In an animal-trap of the impalement type, a traveling member comprising an upper and lower plate adjustably connected, said upper plate carrying the impaling-pins, said pins projecting below the surface of the lower plate, and means for varying the distance of projection of said pins, substantially as described.

6. In an animal-trap, a base having impaling-pins, a plurality of traveling members acting in conjunction with the base, guides projecting upwardly from the base, on which the members travel, springs anchored in the base, coiled around the guides and secured to the lower portions of the traveling members, said traveling members each comprising an upper and lower plate, impaling-pins embedded in the upper plate and projecting through the lower plate; said lower plate having threaded apertures, screws rotatable in the upper plate and operating in the threads of the lower plate, bait-hooks depending through apertures in the traveling members and suspended by rods supported between the guides, and triggers formed with the bait-hooks and hooks on the upper surfaces of the traveling sections engaged by the triggers, substantially as described.

In testimony whereof I have affixed my signature in presence of two witnesses.

MARTHA E. FOREMAN.

Witnesses:
 G. F. EDWARDS,
 JNO. W. HOPPER.